United States Patent
Wang

(10) Patent No.: US 10,542,733 B2
(45) Date of Patent: Jan. 28, 2020

(54) FLAT HEATER

(71) Applicant: EIKO ELECTRIC PRODUCTS CORP., Taipei (TW)

(72) Inventor: Yu-Chin Wang, Taipei (TW)

(73) Assignee: EIKO ELECTRIC PRODUCTS CORP., Taipei (TW)

( * ) Notice: Subject to any disclaimer, the term of this patent is extended or adjusted under 35 U.S.C. 154(b) by 304 days.

(21) Appl. No.: 15/702,661

(22) Filed: Sep. 12, 2017

(65) Prior Publication Data

US 2019/0075767 A1 Mar. 14, 2019

(51) Int. Cl.
*H05B 3/20* (2006.01)
*H05B 3/22* (2006.01)
*H05B 3/80* (2006.01)
*H05B 3/78* (2006.01)
*A01K 63/06* (2006.01)
*H05B 1/02* (2006.01)

(52) U.S. Cl.
CPC ......... *A01K 63/065* (2013.01); *H05B 1/0283* (2013.01); *H05B 3/80* (2013.01)

(58) Field of Classification Search
CPC ............... H05B 1/0283; H05B 1/0297; H05B 3/04–08; H05B 3/20–22; H05B 3/78–82
See application file for complete search history.

(56) References Cited

U.S. PATENT DOCUMENTS

| | | | | |
|---|---|---|---|---|
| 3,796,858 | A * | 3/1974 | Cohn ................... | A01K 63/065 392/498 |
| 6,363,216 | B1 * | 3/2002 | Bradenbaugh .......... | F24H 1/202 219/441 |
| 2011/0148012 | A1 * | 6/2011 | Cooper ................ | B22D 41/015 266/200 |
| 2011/0239951 | A1 * | 10/2011 | Wang ................... | A01K 63/047 119/261 |
| 2013/0087549 | A1 * | 4/2013 | Wang ....................... | H05B 3/78 219/489 |
| 2016/0345546 | A1 * | 12/2016 | Wang ................... | A01K 63/065 |
| 2019/0239491 | A1 * | 8/2019 | Yu ............................. | A01K 7/02 |
| 2019/0246455 | A1 * | 8/2019 | Weber ................ | A61H 33/0087 |

* cited by examiner

*Primary Examiner* — Michael A Laflame, Jr.
(74) *Attorney, Agent, or Firm* — Guice Patents PLLC

(57) ABSTRACT

A flat heater includes a housing including an accommodating groove formed inside the housing; a circuit unit disposed within the housing to control the heater, wherein the circuit unit includes a circuit board and a first rectifier disposed on the circuit board; a heating module disposed in the accommodating groove and electrically connected to the circuit unit, wherein the heating module includes a plurality of heating pipes and a plurality of second rectifiers disposed in each of the heating pipes; an upper cover assembled to a top surface of the housing and comprising a long side and a short side, wherein a plurality of fluid-permeable holes are formed on the upper cover; and a suction member inserted into the through hole and attached to an object and thereby fixing the housing to the object.

10 Claims, 4 Drawing Sheets

FLAT HEATER

BACKGROUND OF THE INVENTION

Field of the Invention

The invention relates to a heater, and more particularly to a heating device capable of placing into water received in an aquarium.

Description of the Related Art

People may set an ornamental aquarium at home or in the company for interest. A heater is often used in the aquarium to obtain a suitable temperature of water for aquatic creatures.

In general, a high power heater is mounted in an aquarium to keep water temperature at a constant value. Conventional high power heater generates heat through nichrome wires which are winded on a thermal-isolated frame made by mica or ceramic. The thermal-isolated frame is mounted into a tubular shell which can be made by various materials such as metal, ceramic, glass and plastic. Although the metal shell has a higher strength and better heat dissipation, however electrical current leakage happens easily when the circuit has poor contact or shortage. The metal shell also easily have rusty problem.

The solution for the problems of metal shell is modified by plastic shell. The plastic shell is light-weighted and has no rusty or current leakage problems. The thermal-isolated frame with winded nichrome wires is not easily mounted to a central line of the plastic shell, and this often causes uneven heat dissipation, especially for the high power heater. When the water level of the aquarium is abnormal, the heater may heats no water and thus burns itself.

BRIEF SUMMARY OF THE INVENTION

An object of the invention is to provide a flat heater which is a submersible heater. The flat heater of the invention is made of light-weighted plastic, and several bi-directional silicon controlled rectifiers serving as switches are mounted in the flat heater of the invention to prevent the dry heating problem.

The invention provides a flat heater. The flat heater in accordance with an exemplary embodiment of the invention includes a housing including an accommodating groove formed inside the housing; a circuit unit disposed within the housing and configured to control the heater, wherein the circuit unit comprises a circuit board and a first rectifier disposed on the circuit board; a heating module disposed in the accommodating groove and electrically connected to the circuit unit, wherein the heating module comprises a plurality of heating pipes and a plurality of second rectifiers, and each of the second rectifiers is disposed in each of the heating pipes; an upper cover assembled to a top surface of the housing and comprising a long side and a short side, wherein a plurality of fluid-permeable holes are formed on the upper cover and at least one through hole is formed on the upper cover and near the long side; and a suction member inserted into the through hole and attached to an object and thereby fixing the housing to the object.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
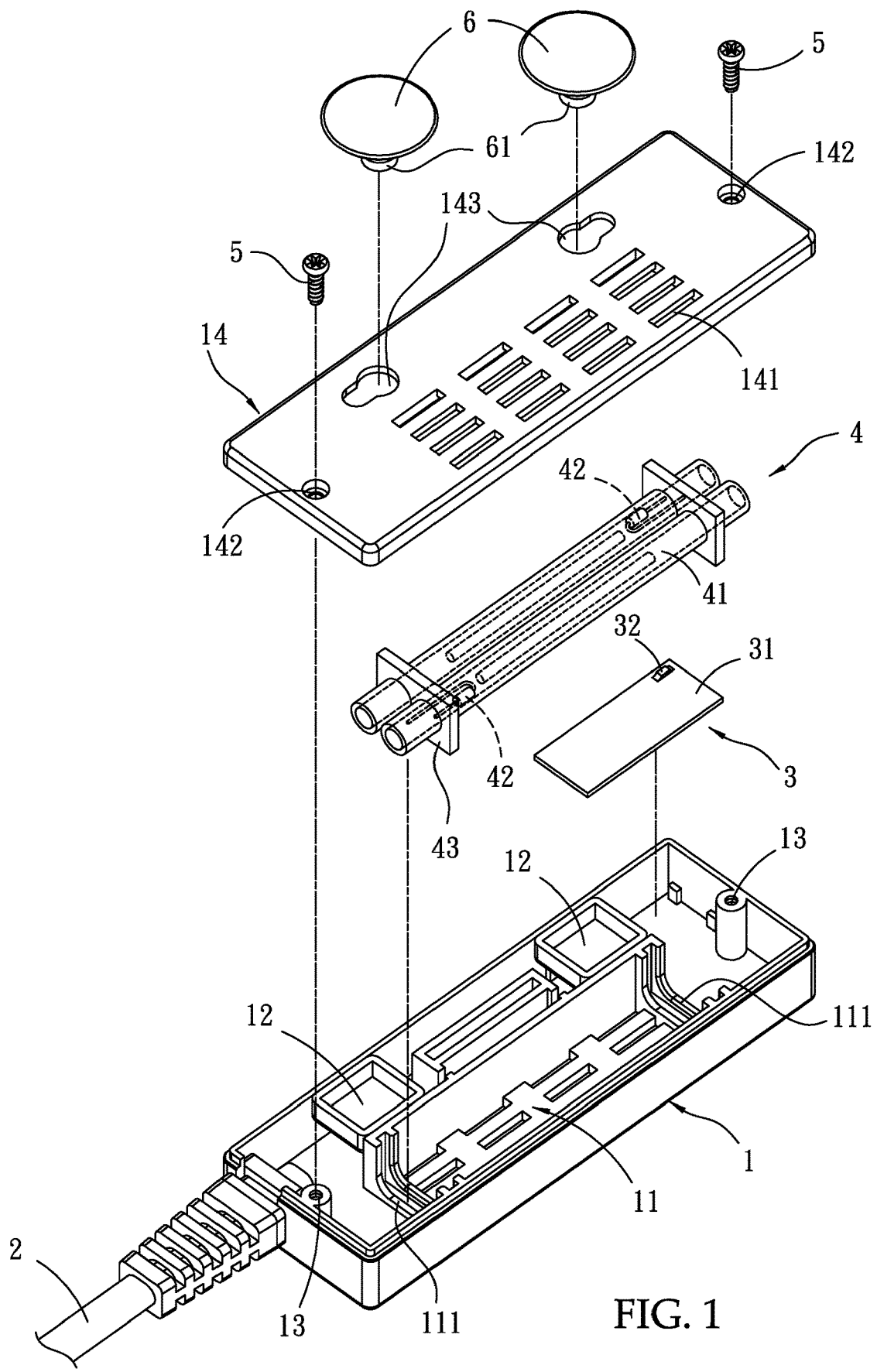
FIG. 1 is an exploded view of an embodiment of a flat heater of the invention.
Figure 2:
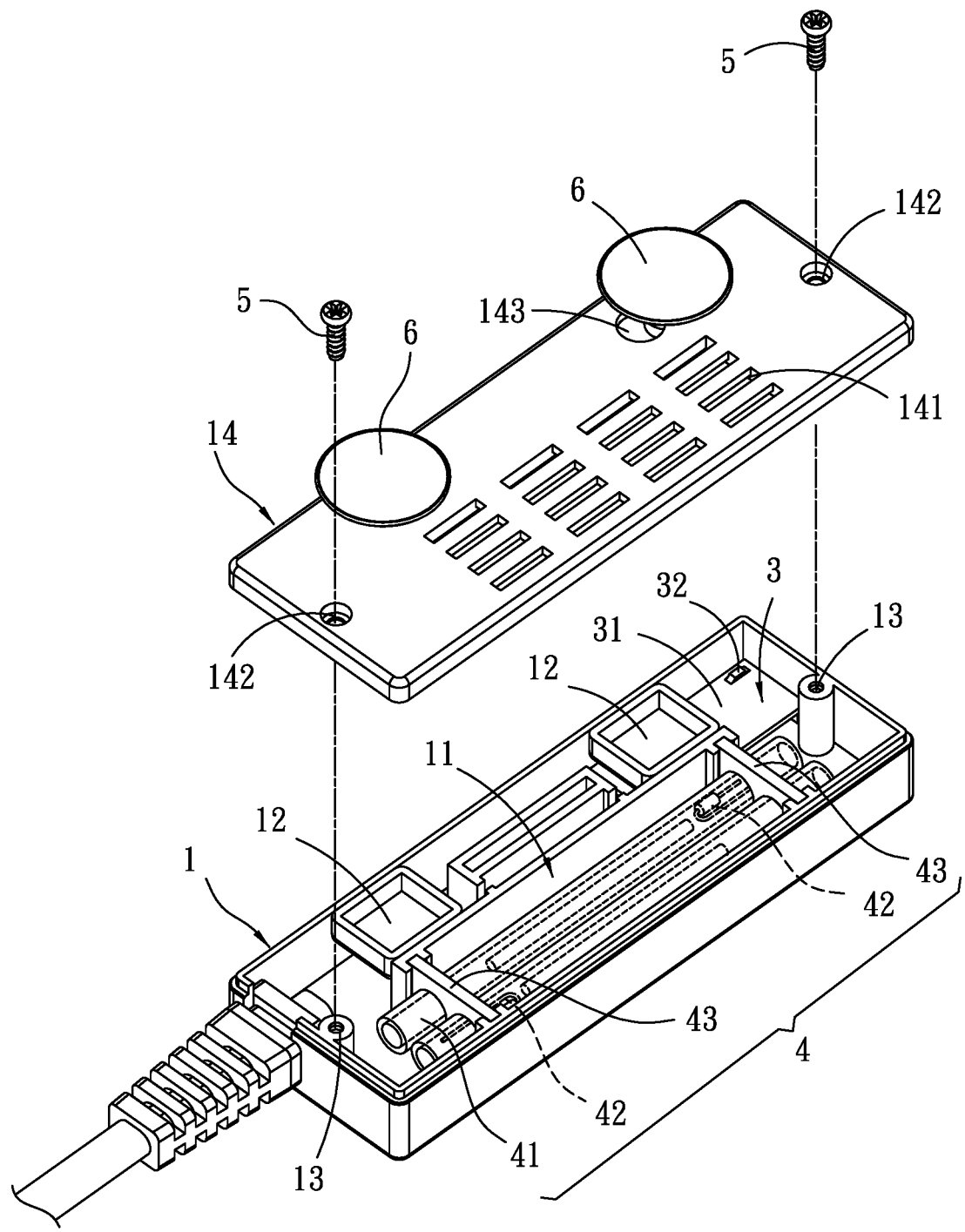
FIG. 2 is a perspective view of an embodiment of a flat heater of the invention which is partially assembled.

Referring to FIG. 1, an embodiment of a flat heat of the invention includes a housing 1. In this embodiment, the housing 1 has two long sides and two short sides. The long side are adjacent to the short side. A power cable 2 is mounted on the short side. The power cable 2 is used to connect an external power supply which provides electrical power for the flat heater. The housing 1 has an accommodating groove 11 extending along the long side of the housing 1. The accommodating groove 11 has two ends. The housing further has two depressions 12. One of the depressions 12 is formed near one of the ends of the accommodating groove 11, and the other of the depression 12 is formed near the other of the ends of the accommodating groove 11. The depressions 12 are rectangular. Each of the short sides of the housing 1 has a screw hole 13. The screw hole 13 is formed on an inner wall of the short side and near an edge of the short side. The flat heater of the invention further includes a circuit unit 3 electrically connected to the power cable 2. The circuit unit 3 is configured to control functions and operations of the flat heater. The circuit unit 3 is a water-proof circuit. The circuit unit 3 includes a circuit board 31 and a first rectifier 32 disposed on the circuit board 31. In this embodiment, the first rectifier 32 is a bi-directional silicon controlled rectifier. The first rectifier 32 serves as a switch and is configured to detect the environment for safe heating. The detection feedbacks to the circuit unit 3 for the first rectifier 32 switching on or off the flat heater of the invention, whereby the water temperature is maintained and the dry heating problem is also prevented.

Referring to FIG. 1 again, the flat heater of the invention further includes a heating module 4. The heating module 4 is received in the accommodating groove 11 of the housing 1 and electrically connected to the circuit unit 3. In this embodiment, the heating module 4 includes a plurality of heating pipes 41. The heating pipes 41 includes resistance wires which generate heat. The heating pipes 41 have thermistor which serves as an interface detecting temperature. Each of the heating pipes 41 has a second rectifier 42. In this embodiment, the second rectifier 42 is a bi-directional silicon controlled rectifier. The second rectifier 42 serves as a switch and has a detecting function. The second rectifier 42 is configured to control the environment for safe heating and prevent the dry heating problem. The second rectifiers 42 are electrically connected to the circuit unit 3 and controlled by the circuit unit 3. The second rectifiers 42 is configured to feedback the environment for safe heating to the circuit unit 3. The circuit unit 3 controls the second rectifiers 42 to switch on or switch off the heating pipes 41 through a control mechanism. Each of the heating pipes 41 has two ends, and each of the ends of each heating pipes 41 is held by a positioning plate 43. In this embodiment, the ends of two adjacent heating pipes 42 are commonly held by one of the positioning plates 43. The positioning plates 43 engage engaging grooves 111 which are formed on two ends of the accommodating grooves 11 so that the heating pipes 41 are positioned in the accommodating groove 11.

Figure 3:
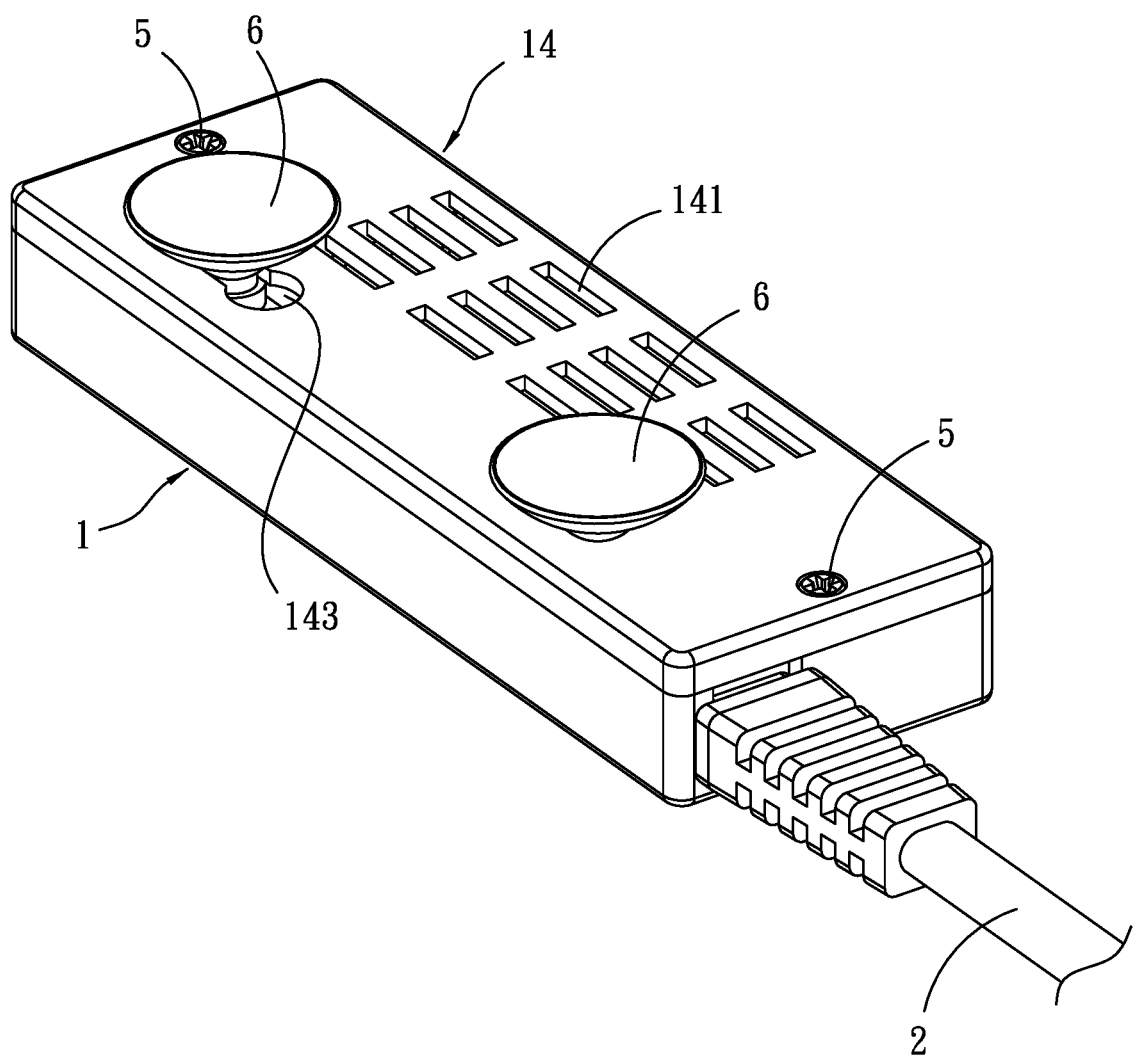
FIG. 3 is a perspective view of an embodiment of a flat heater of the invention which is completely assembled.

Referring to FIG. 1, the flat heater further includes an upper cover 14 assembled to a top of the housing 1. The upper cover 14 is a plate. A plurality of permeable holes 141 are formed on the upper cover 14. The permeable holes 141 are long holes. The upper cover 14 has two long sides and two short sides. A locking hole 142 is formed on each of the short sides. The locking hole 142 corresponds to the screw hole 13 of the housing 1. A bolt extends through the locking hole 142 and screwed into the screw hole 13 so that the upper cover 13 is fixed to the housing 1. Two through holes 143 are formed on the long side of the upper cover 13. The through holes 143 are gourd-shaped, and a suction member 6 is inserted into the through hole 143. The suction member 6 is attached to an object, whereby the housing 1 is positioned to the object. The suction member 6 has a post 61 which is inserted into the through hole 143 and received in the depression 12 of the housing 1. FIG. 3 shows the completely assembled flat heater.

Figure 4:
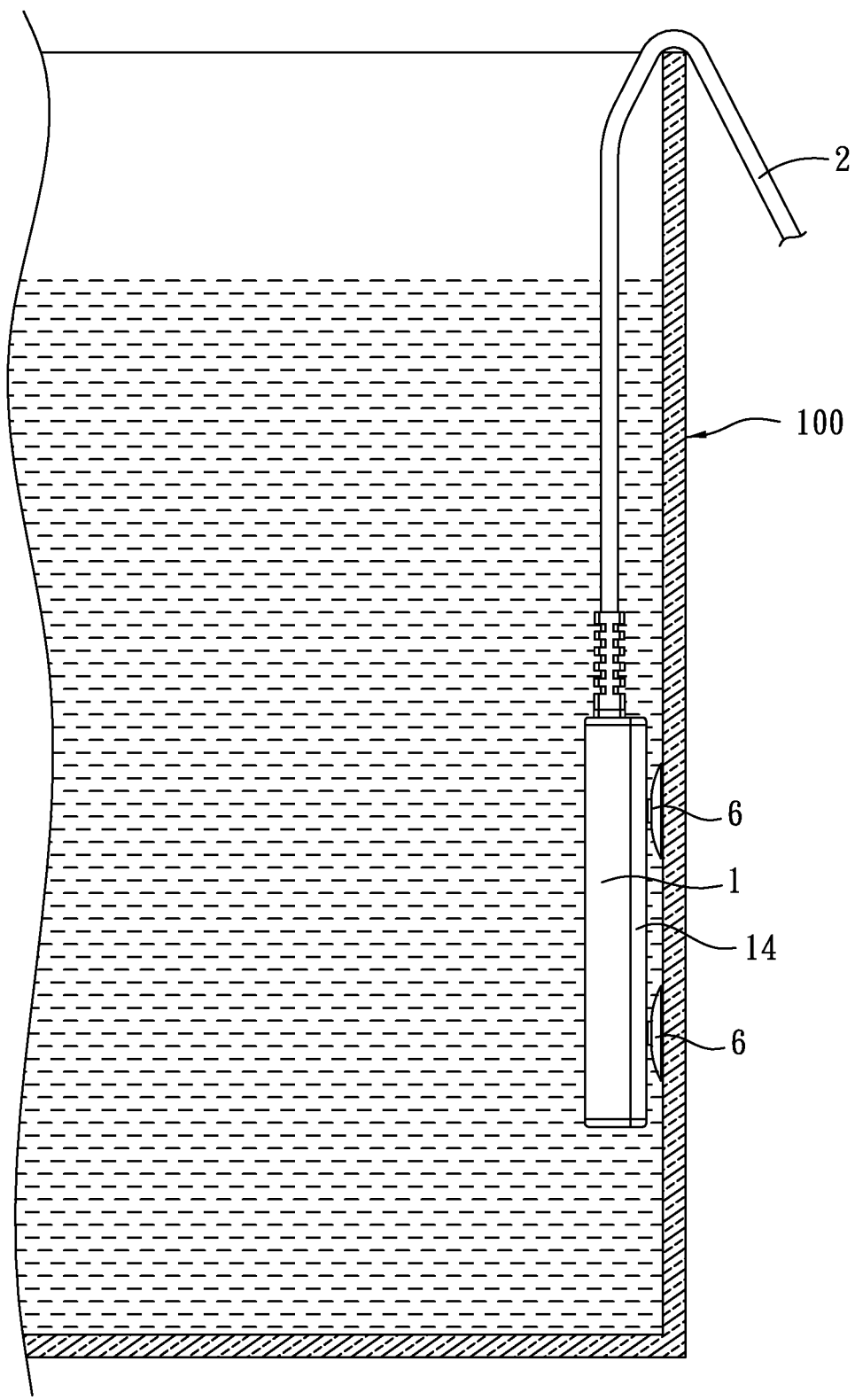
FIG. 4 depicts an embodiment of a flat heater of the invention used in an aquarium.

Referring to FIG. 4, the flat heater of the invention is a submersible heater which is fixed to a wall of an aquarium 100 through attachment of the suction member 6 to the aquarium 100. The flat heater is fully immersed in the water, and water enters the flat heater through the permeable holes 141. The heating pipes 41 generate heat to heat the water in the aquarium 100. The first rectifier 32 and the second rectifier 42 serve as a protection mechanism to switch on or switch off the heating pipes 41 and thus prevent the dry heating problem.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A flat heater, comprising:
   a housing comprising an accommodating groove formed inside the housing;
   a circuit unit disposed within the housing and configured to control the heater, wherein the circuit unit comprises a circuit board and a first rectifier disposed on the circuit board;
   a heating module disposed in the accommodating groove and electrically connected to the circuit unit, wherein the heating module comprises a plurality of heating pipes and a plurality of second rectifiers, and each of the second rectifiers is disposed in each of the heating pipes;
   an upper cover assembled to a top surface of the housing and comprising a long side and a short side, wherein a plurality of fluid-permeable holes are formed on the upper cover, at least one through hole is formed on the upper cover and near the long side, and the upper cover is a plate; and
   a suction member inserted into the through hole and attached to an object and thereby fixing the housing to the object.

2. The flat heater as claimed in claim 1, further comprising a power cable, wherein the housing comprises a short side, the power cable is disposed on the short side, the power cable is electrically connected to the circuit unit, and an external power supply provides electrical power through the power cable.

3. The flat heater as claimed in claim 1, wherein the accommodating groove has two ends, and the accommodating groove comprises two engaging grooves disposed on each of the ends, the heating pipes are inserted into two positioning plates which are engaged with the engaging grooves to position the heating pipes.

4. The flat heater as claimed in claim 1, wherein the housing further comprises two depressions disposed near two ends of the accommodating groove, the suction member has a post inserted into the through hole and received in the depression.

5. The flat heater as claimed in claim 1, wherein a screw hole is formed on an inner wall of a short side of the housing, and a locking hole is formed on a short side of the upper cover, and a bolt extends through the locking hole and screwed into the screw hole to join the upper cover to the housing.

6. The flat heater as claimed in claim 1, wherein the circuit unit is a water-proof circuit.

7. The flat heater as claimed in claim 1, wherein the first rectifier is a bi-directional silicon controlled rectifier.

8. The flat heater as claimed in claim 1, wherein the heating pipe is a heating pipe with resistance wires.

9. The flat heater as claimed in claim 1, wherein the permeable hole is a slot hole.

10. The flat heater as claimed in claim 1, wherein the through hole is gourd-shaped.

\* \* \* \* \*